(12) United States Patent
Yamamoto

(10) Patent No.: US 8,443,669 B2
(45) Date of Patent: May 21, 2013

(54) SERVO ACCELEROMETER

(75) Inventor: Shuichi Yamamoto, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 613 days.

(21) Appl. No.: 12/688,872

(22) Filed: Jan. 16, 2010

(65) Prior Publication Data
US 2010/0192691 A1 Aug. 5, 2010

(30) Foreign Application Priority Data
Jan. 30, 2009 (JP) ................. 2009-019925

(51) Int. Cl.
G01P 15/13 (2006.01)
(52) U.S. Cl.
USPC ............. 73/514.21; 73/514.22; 73/514.23
(58) Field of Classification Search
USPC ............................................. 73/514.21
See application file for complete search history.

(56) References Cited

U.S. PATENT DOCUMENTS

| | | | |
|---|---|---|---|
| 3,559,050 A | | 1/1971 | Mifsud |
| 4,856,333 A | * | 8/1989 | Ito ................. 73/514.19 |
| 6,073,490 A | * | 6/2000 | Konovalov et al. ......... 73/514.17 |
| 6,422,076 B1 | | 7/2002 | Prokofiev et al. |
| 7,805,996 B2 | * | 10/2010 | Yamamoto ................. 73/514.21 |
| 2003/0188578 A1 | | 10/2003 | Ando |
| 2006/0123904 A1 | | 6/2006 | Dwyer |

FOREIGN PATENT DOCUMENTS

| | | |
|---|---|---|
| EP | 1 890 161 | 2/2008 |
| JP | 61-259174 | 11/1986 |
| JP | S64-012273 | 1/1989 |
| JP | 05-240641 | 9/1993 |
| JP | 08-114620 | 5/1996 |
| JP | 08-292208 | 11/1996 |
| JP | 11-281670 | 10/1999 |
| JP | 2002-168878 | 6/2002 |
| JP | 2002-311046 | 10/2002 |
| JP | 2002311046 A * | 10/2002 |
| JP | 2003-163991 | 6/2003 |
| JP | 2003-302420 | 10/2003 |
| JP | 2008-070356 | 3/2008 |

OTHER PUBLICATIONS

Office Action issued on Nov. 16, 2010 by the Japanese Patent Office for counterpart foreign patent application JP 2009-019925.
EP Extended Search Report issued Dec. 5, 2008 for EP application 07015584.1.
Office Action issued Dec. 11, 2009 for JP 2007-202478.
Office Action issued Mar. 9, 2010 for JP 2007-202478.
Extended European Search Report (EESR) issued on Sep. 21, 2011 by the European Patent Office for corresponding European patent application No. 10151931.2.

* cited by examiner

*Primary Examiner* — Hezron E Williams
*Assistant Examiner* — Mark A Shabman
(74) *Attorney, Agent, or Firm* — David N. Lathrop

(57) ABSTRACT

A servo accelerometer has a pair of housings having a tubular part, one end opened and the other end closed with a closing part. A frame that supports a pendulum is held between the housings. A permanent magnet is attached to each of the closing parts with a bottom pole piece interposed therebetween. Coils arranged in annular magnetic gaps are attached to the pendulum. The closing part has a recess, and the bottom pole piece is disposed in the recess. The outer circumference of the bottom pole piece faces the inner circumference of the recess with a predetermined gap interposed therebetween.

3 Claims, 4 Drawing Sheets

SERVO ACCELEROMETER

BACKGROUND OF THE INVENTION

1. Field of the Invention

The present invention relates to a servo accelerometer that has a pendulum provided with a coil interlinked with a magnetic field produced by a permanent magnet and is configured to apply a current determined by the amount of swing of the pendulum to the coil to balance the pendulum in the vicinity of the zero point.

2. Description of Related Art

FIGS. 1A and 1B shows a configuration of a conventional servo accelerometer of this type.

A pendulum 12 disposed inside a circular frame 11 has the shape of a circular plate having a part of the circumference cut by a chord. The pendulum 12 is supported by the frame 11 by the cut part 12a of the pendulum 12 being coupled to the frame 11 by a pair of hinges 13. The frame 11, the pendulum 12 and the pair of hinges 13 are integrally formed of quartz glass. The pair of hinges 13 is thin in order to allow a required swing of the pendulum 12.

The opposite surfaces of the frame 11 abut against a first housing 14 and a second housing 15, respectively, and the frame 11 is held between the pair of the first and second housings 14 and 15. Both the first and second housings 14 and 15 substantially have the shape of a cylinder one end of which is open and the other end of which is closed, and the open ends abut against the frame 11. Annular protrusions 14g and 15g are formed along the inner circumference of the open ends of the first and second housings 14 and 15, which abut against the frame 11. The first and second housings 14 and 15 serve also as a magnetic yoke and are made of a magnetic material. The magnetic material may be Invar, which is magnetic and has a low thermal expansion coefficient.

At the center of the inside of the first and second housings 14 and 15, a first permanent magnet 16 and a second permanent magnet 17, both of which are cylindrical samarium-cobalt magnets, are disposed. In this example, the first and second permanent magnets 16 and 17 are installed on the inner surface of closing parts 14a and 15a of the first and second housings 14 and 15 with disk-shaped bottom pole pieces 18 and 19 interposed therebetween, respectively, and disk-shaped pole pieces 21 and 22 having an increased thickness along the circumference are disposed on the upper surface of the first and second permanent magnets 16 and 17, respectively.

The first and second permanent magnets 16 and 17, the bottom pole pieces 18 and 19, and the pole pieces 21 and 22 are assembled by adhesion, for example. The bottom pole pieces 18 and 19 and the pole pieces 21 and 22 are made of an electromagnetic soft iron (compliant with Japanese Industrial Standards C 2503), and the bottom pole pieces 18 and 19 are fixed to the closing parts 14a and 15a of the first and second housings 14 and 15 by adhesion or laser welding, for example. The bottom pole pieces 18 and 19 serve to accommodate the difference in thermal expansion between the first and second housings 14 and 15 and the first and second permanent magnets 16 and 17.

For example, the first permanent magnet 16 is arranged so that the N pole abuts against the pole piece 21, and the S pole abuts against the bottom pole piece 18. The first permanent magnet 16 and the first housing 14 form a primary magnetic circuit, and a first magnetic gap 23 is formed between the inner circumference of the protrusion 14g at the open end of the first housing 14 and the first permanent magnet 16 or, more specifically, the outer circumference of the pole piece 21 in this example. In the second housing 15, a similar second magnetic gap 24 is formed.

In the cylindrical first and second magnetic gaps 23 and 24, a first coil 27 wound around a bobbin 25 and a second coil 28 wound around a bobbin 26 are disposed, respectively. The first and second coils 27 and 28 are coaxial with the first and second permanent magnets 16 and 17 and attached to the opposite surfaces of the pendulum 12. The ends of the bobbins 25 and 26 on the side of the pendulum 12 are closed by attachment plates 25a and 26a, and the first and second coils 27 and 28 are attached to the pendulum 12 by fixing the attachment plates 25a and 26a to the pendulum 12 by adhesion.

In this example, capacitance-type displacement detecting means detects displacement (swing) of the pendulum 12. On the opposite surfaces of the pendulum 12, arc-shaped electrodes 29a and 29b surrounding the first and second coils 27 and 28 are formed by gold plating or the like. The first and second housings 14 and 15 constitute electrodes opposed to the electrodes 29a and 29b. Within the angular range of the electrodes 29a and 29b formed on the pendulum 12, the open end of the first and second housings 14 and 15 has frame abutting surfaces 14b and 15b, recesses 14c and 15c, and electrode surfaces 14d and 15d arranged in this order from the outside, as shown in FIG. 1A. The electrode surfaces 14d and 15d are spaced apart from the electrodes 29a and 29b on the pendulum 12 by a predetermined distance.

The servo accelerometer configured as described above detects the swing of the pendulum 12 caused by an input acceleration in the X direction as a variation in capacitance between the electrodes 29a and 14d and between the electrodes 29b and 15d. The electrode surfaces 14d and 15d are at a common potential, the detection signals on the electrodes 29a and 29b are differentially amplified by a predetermined electric circuit (not shown), and a current determined by the capacitance difference detected on the electrodes 29a and 29b flows through the first and second coils 27 and 28. The current flowing through the first and second coils 27 and 28 and the magnetic field produced by the first and second permanent magnets 16 and 17 interact to restore the pendulum 12 to the original position, and the pendulum 12 is balanced in the vicinity of the zero point. The current flowing in this case is proportional to the acceleration applied to the pendulum 12, so that the input acceleration can be determined from the current.

As described above, for the conventional servo accelerometer, the frame 11, the pendulum 12 and the hinges 13 are made of quartz glass, and the first and second housings 14 and 15 are made of Invar. By using those materials having low thermal expansion coefficients in this way, dimensional changes or displacements caused by temperature changes or strains induced by stresses are minimized.

However, Invar, which is used for the first and second housings 14 and 15 to make the housings participate in the magnetic circuit, has a saturation flux density of about 1.2 T at room temperature (25 degrees C.), and the saturation flux density of Invar highly depends on the temperature. In particular, in a high temperature environment, the magnetic circuit is easily saturated. Thus, the operating temperature range and the measurement range are limited, and the magnetic circuit can be downsized only to a limited extent.

FIGS. 2A and 2B shows a configuration of a servo accelerometer described in Japanese Patent Application Laid-Open No. H8-292208 (issued Nov. 5, 1996, referred to as Patent literature 1 hereinafter) that solves the problem of the saturation of the magnetic circuit described above. In this example, magnetic reinforcing plates 31 and 32 are attached to the outer surface of the closing parts 14a and 15a of the first and second housings 14 and 15, respectively.

The magnetic reinforcing plates 31 and 32 are made of a material having a higher saturation flux density than the first and second housings 14 and 15. The material may be an electromagnetic soft iron, for example.

The magnetic reinforcing plates 31 and 32 disposed on the outer surface of the closing parts 14a and 15a of the first and second housings 14 and 15 serve to eliminate the saturation of the magnetic circuit at the closing parts 14a and 15a.

However, the servo accelerometer having the magnetic reinforcing plates 31 and 32 shown in FIGS. 2A and 2B cannot be easily downsized because of the magnetic reinforcing plates 31 and 32 attached to the outer surface of the first and second housings 14 and 15. The servo accelerometer further has a problem that the cost also increases because of the increased number of components.

SUMMARY OF THE INVENTION

An object of the present invention is to provide a compact servo accelerometer that can eliminate saturation of a magnetic circuit and can be manufactured inexpensively.

According to a first aspect of the present invention, there is provided a servo accelerometer having a pair of housings having a tubular part, made of a magnetic material, and having one end opened and the other end closed with a closing part, in which a frame that supports a pendulum inside thereof via hinges is held between said one ends of the pair of housings, a permanent magnet is attached to an inner surface of each of the closing parts of the pair of housings with a bottom pole piece made of a magnetic material interposed therebetween, an annular magnetic gap is formed between each permanent magnet and the inner circumference of said one end of the corresponding one of the pair of housings, and a pair of coils arranged in the annular magnetic gaps to be coaxial with each other is attached to the opposite surfaces of the pendulum, wherein each of the closing parts has a recess formed in the inner surface thereof, and the bottom pole piece is disposed in the recess, and the outer circumference of the bottom pole piece faces the inner circumference of the recess with a predetermined gap interposed therebetween.

According to a second aspect of the present invention, there is provided a servo accelerometer having a pair of housings having a tubular part, made of a magnetic material, and having one end opened and the other end closed with a closing part, in which a frame that supports a pendulum inside thereof via hinges is held between said one ends of the pair of housings, a permanent magnet is attached to an inner surface of each of the closing parts of the pair of housings with a bottom pole piece made of a magnetic material interposed therebetween, an annular magnetic gap is formed between each permanent magnet and the inner circumference of said one end of the corresponding one of the pair of housings, and a pair of coils arranged in the annular magnetic gaps to be coaxial with each other is attached to the opposite surfaces of the pendulum, wherein the bottom pole pieces are sized to cover substantially the entire inner surface of the closing part, and the outer circumference of the bottom pole piece faces the inner circumference of the tubular part with a predetermined gap interposed therebetween.

According to the present invention, the first and second housings are each arranged in the vicinity of the bottom pole piece to face the outer circumference of the bottom pole piece with a gap interposed therebetween, and a second magnetic path is formed across the gaps when magnetic saturation occurs at the center part of the closing parts of the first and second housings where the magnetic flux is particularly concentrated. Thus, saturation of the magnetic circuit can be avoided.

Therefore, the servo accelerometer according to the present invention is compact and manufactured inexpensively, compared with the conventional servo accelerometer that has magnetic reinforcing plates attached to the first and second housings.

DETAILED DESCRIPTION OF THE INVENTION

In the following, embodiments of the present invention will be described.

Figure 3B:
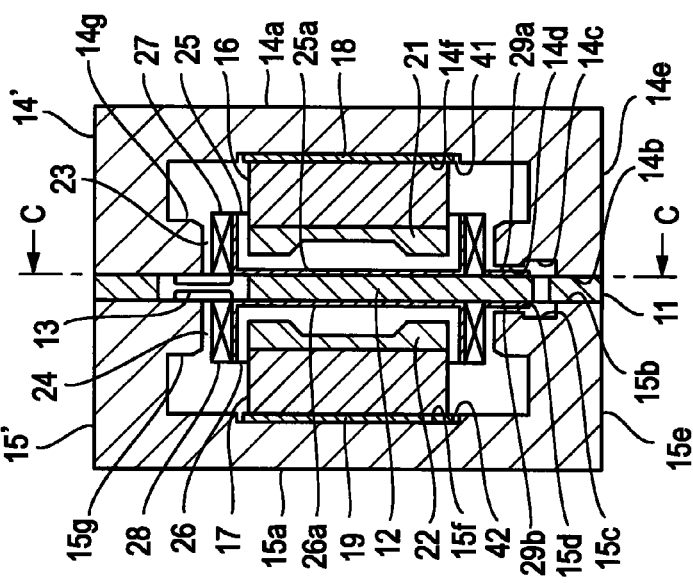
FIG. 3B is a cross-sectional view taken along the line C-C in FIG. 3A.
Figure 3A:
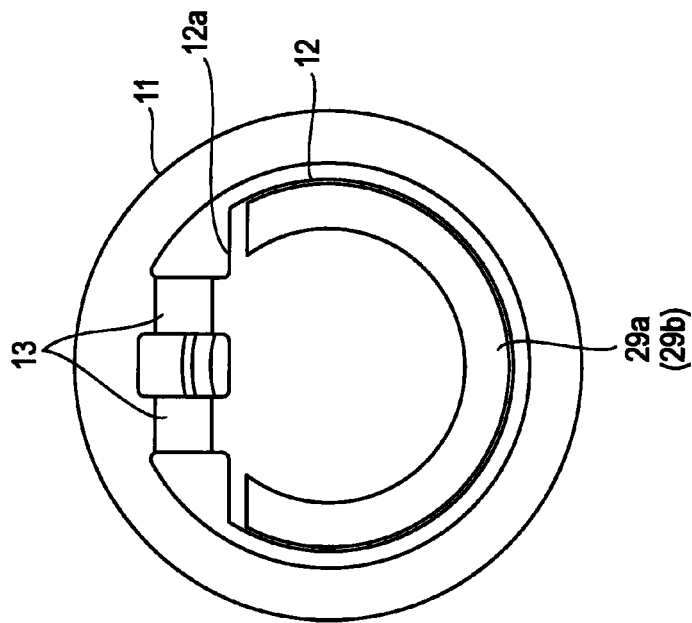
FIG. 3A is a cross-sectional view of a servo accelerometer according to a first embodiment of the present invention.

FIGS. 3A and 3B show a configuration of a servo accelerometer according to a first embodiment of the present invention. Parts corresponding to those shown in FIGS. 1A and 1B are denoted by the same reference numerals, and detailed illustration thereof will be omitted.

Figure 1A:
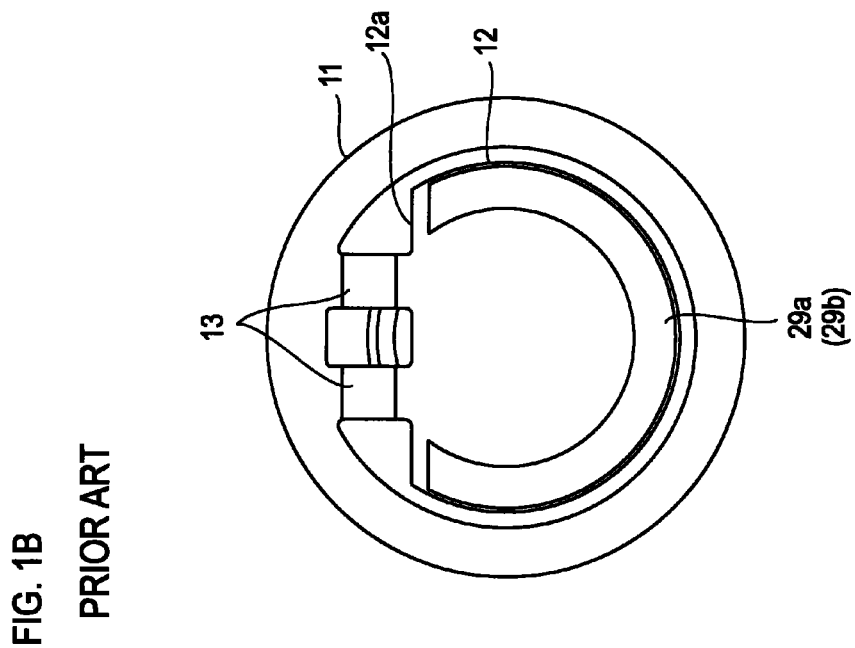
FIG. 1A is a cross-sectional view of a conventional servo accelerometer.
Figure 1B:
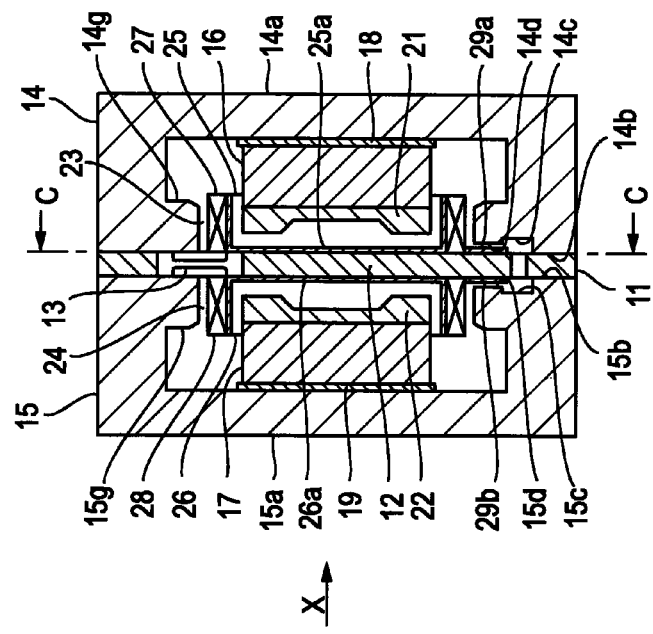
FIG. 1B is a cross-sectional view taken along the line C-C in FIG. 1A.

As with the first and second housings 14 and 15 shown in FIG. 1A, first and second housings 14' and 15' have tubular parts 14e and 15e one ends of which are open, and closing parts 14a and 15a that close the other end of the tubular parts 14e and 15e, respectively, and annular protrusions 14g and 15g are formed along the inner circumference of the open ends of the tubular parts 14e and 15e.

In this embodiment, the closing parts 14a and 15a have circular recesses 14f and 15f formed in the inner surface, and disk-shaped bottom pole pieces 18 and 19 are disposed in the recesses 14f and 15f, respectively. Predetermined gaps 41 and 42 are formed between the outer circumference of the bottom pole pieces 18 and 19 and the inner circumference of the recesses 14f and 15f, and the outer circumference of the bottom pole pieces 18 and 19 face the inner circumference of the recesses 14f and 15f with the gaps 41 and 42 interposed therebetween.

Comparing the shape of the closing parts 14a and 15a of the first and second housings 14' and 15' having the recesses 14f and 15f with the shape of the closing parts 14a and 15a of the first and second housings 14 and 15 shown in FIG. 1A, the thickness of the part on which the bottom pole piece 18, 19 is disposed is not changed, and the thickness of the part surrounding the bottom pole piece 18, 19 is increased (that is, the part surrounding the bottom pole piece is raised).

In the configuration as described above, the first and second housings 14' and 15' are made of Invar, and the bottom pole pieces 18 and 19 are made of an electromagnetic soft iron (compliant with JIS C 2503), as with the conventional servo accelerometer. The electromagnetic soft iron has a saturation flux density of about 2.2 T at room temperature (25 degrees C.). In addition, the saturation flux density of the electromagnetic soft iron is higher than and less temperature dependent than the saturation flux density of Invar. Thus, even at higher temperatures, the decrease of the saturation flux density is low.

In this embodiment configured as described above, a magnetic path described below is formed.

(1) When the servo accelerometer is at room temperature, magnetic saturation does not occur even at the center part of the closing parts 14a and 15a of the first and second housings 14' and 15' where the magnetic flux particularly tends to be concentrated. Thus, the center part of the closing parts 14a and 15a (the part where the recesses 14f and 15f are formed) serves as a magnetic path, and the magnetic flux flows through the bottom pole pieces 18 and 19 in the thickness direction thereof.

(2) When the temperature of the servo accelerometer rises to higher temperature, the saturation flux density of the first and second housings 14' and 15' made of Invar decreases, and magnetic saturation occurs from the part where the cross section of the magnetic path is small, or more specifically, the center part of the closing parts 14a and 15a.

The occurrence of the magnetic saturation causes a magnetic flux flowing across the gaps 41 and 42 between the outer circumference of the bottom pole pieces 18 and 19 and the inner circumference of the recesses 14f and 15f of the closing parts 14a and 15a. That is, in addition to the first magnetic path in which a magnetic flux flows in the thickness direction of the bottom pole pieces 18 and 19, a second magnetic path is formed in which a magnetic flux flows between the bottom pole pieces 18 and 19 and the circumference of the closing parts 14a and 15a (the part surrounding the recesses 14f and 15f) across the gaps 41 and 42.

Figure 2B:
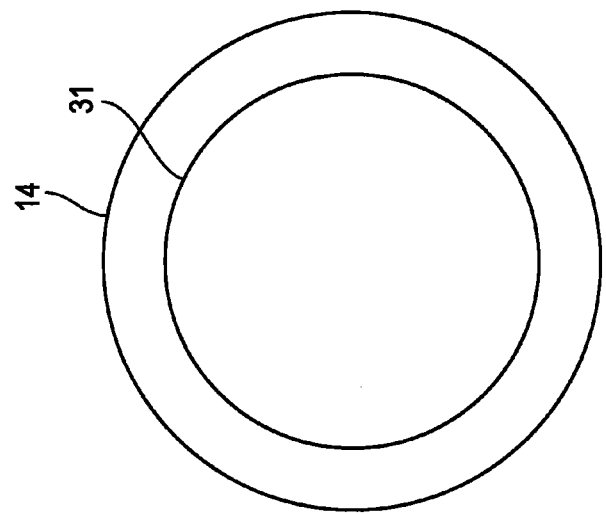
FIG. 2B is a side view of the conventional servo accelerometer having magnetic reinforcing plates.
Figure 2A:
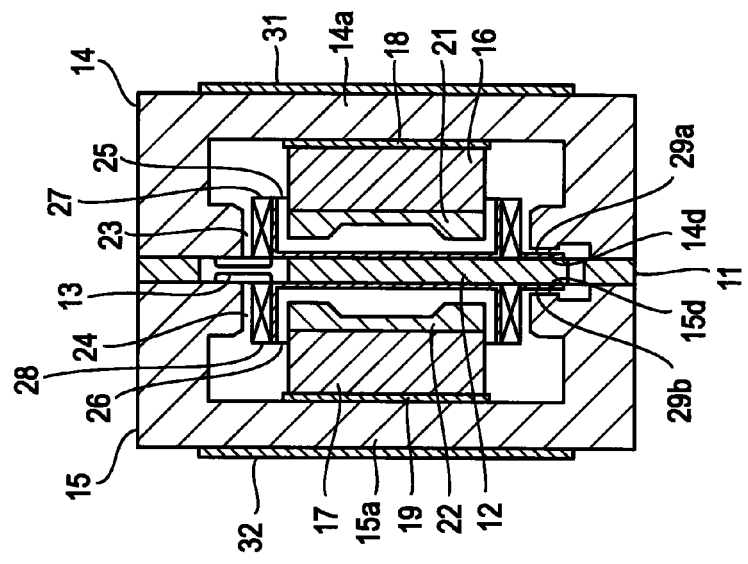
FIG. 2A is a cross-sectional view of a conventional servo accelerometer having magnetic reinforcing plates.

In this embodiment, as described above, the second magnetic path is formed across the gaps 41 and 42 in a high temperature environment. Therefore, saturation of the magnetic circuit can be avoided without the magnetic reinforcing plates 31 and 32, which are required in the example of prior art shown in FIG. 2A, for example.

The size of the gaps 41 and 42 depends on the difference in thermal expansion between the first and second housings 14' and 15' and the bottom pole pieces 18 and 19. That is, the size of the gaps 41 and 42 is determined so that the gaps 41 and 42 do not disappear even when the bottom pole pieces 18 and 19 are more significantly thermally expanded than the first and second housings 14' and 15' as the temperature rises. The gaps 41 and 42 prevent the radial thermal stress in the bottom pole pieces 18 and 19 from directly acting on the first and second housings 14' and 15' and thereby causing a stress-induced strain in the pendulum 12, for example.

Figure 4B:
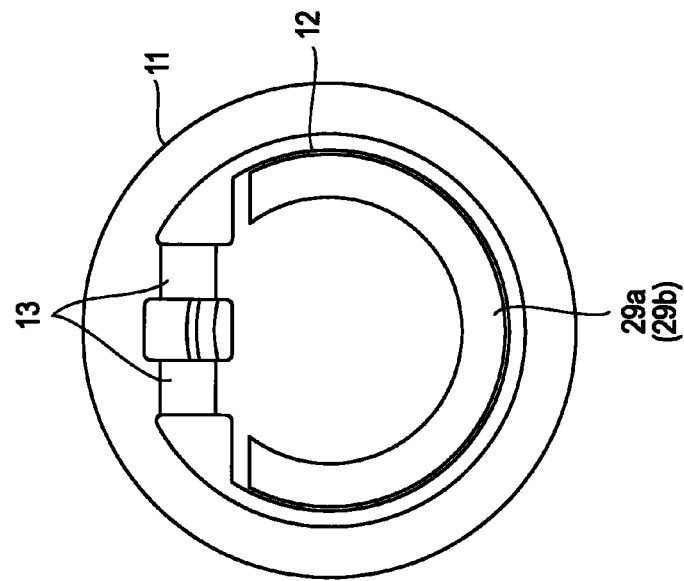
FIG. 4B is a cross-sectional view taken along the line C-C in FIG. 4A.
Figure 4A:
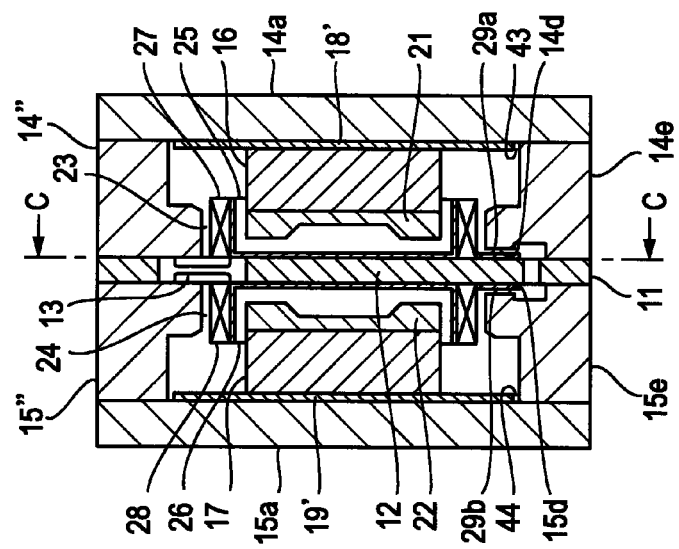
FIG. 4A is a cross-sectional view of a servo accelerometer according to a second embodiment of the present invention.

Next, a second embodiment of the present invention will be described with reference to FIGS. 4A and 4B.

In this embodiment, the inner surface of the closing parts 14a and 15a of first and second housings 14" and 15" has no recess formed therein but is a flat surface. Bottom pole pieces 18' and 19' have a larger diameter than the bottom pole pieces 18 and 19 shown in FIG. 3A and substantially cover the entire inner surface of the closing parts 14a and 15a as shown in FIG. 4A. Predetermined gaps 43 and 44 are formed between the outer circumference of the bottom pole pieces 18' and 19' and the inner circumference of the tubular part 14e and 15e of the first and second housings 14" and 15", and the outer circumference of the bottom pole pieces 18' and 19' face the inner circumference of the tubular parts 14e and 15e with the gaps 43 and 44 interposed therebetween, respectively.

In this embodiment, as in the first embodiment shown in FIGS. 3A and 3B, when the temperature of the servo accelerometer rises to higher temperature, and magnetic saturation occurs at the center part of the closing parts 14a and 15a of the first and second housings 14" and 15", a magnetic flux starts flowing between the outer circumference of the bottom pole pieces 18' and 19' and the inner circumference of the tubular parts 14e and 15e across the gaps 43 and 44, thereby forming a second magnetic path. Thus, saturation of the magnetic circuit can be avoided.

In this embodiment, to facilitate attachment of the bottom pole pieces 18' and 19' having a larger diameter to the inside of the first and second housings 14" and 15", the first and second housings 14" and 15" are divided into the tubular parts 14e and 15e and the closing parts 14a and 15a, respectively. The tubular parts 14e and 15e and the closing parts 14a and 15a can be integrated by adhesion or welding, for example. As in the first embodiment, the size of the gaps 43 and 44 is determined so that the gaps 43 and 44 do not disappear even when the bottom pole pieces 18' and 19' are more significantly thermally expanded than the first and second housings 14" and 15" as the temperature rises.

As described above, according to the present invention, the first and second housings 14' and 15' (14" and 15") are arranged in the vicinity of the bottom pole pieces 18 and 19 (18' and 19') to face the outer circumference of the bottom pole pieces 18 and 19 (18' and 19') with the gaps 41 and 42 (43 and 44) interposed therebetween, and a second magnetic path is formed across the gaps 41 and 42 (43 and 44) when magnetic saturation occurs at the center part of the closing parts 14a and 15a of the first and second housings 14' and 15' (14" and 15") where the magnetic flux is particularly concentrated. Thus, the servo accelerometer can be prevented from being affected by the magnetic saturation in the closing parts 14a and 15a.

In general, to reduce the size of the servo accelerometer, the closing parts 14a and 15a of the first and second housings 14' and 15' (14" and 15") have a smaller magnetic path cross section than the tubular parts 14e and 15e. However, the present invention can solve the problem of the magnetic saturation in the closing parts 14a and 15a.

What is claimed is:

1. A servo accelerometer having a pair of housings having a tubular part, made of a magnetic material, and having one end opened and the other end closed with a closing part, in which a frame that supports a pendulum inside thereof via hinges is held between said one ends of said pair of housings, a permanent magnet is attached to an inner surface of each of the closing parts of said pair of housings with a bottom pole piece made of a magnetic material interposed therebetween, an annular magnetic gap is formed between each permanent magnet and the inner circumference of said one end of the corresponding one of said pair of housings, and a pair of coils arranged in the annular magnetic gaps to be coaxial with each other is attached to the opposite surfaces of said pendulum,
wherein each of said closing parts has a recess formed in the inner surface thereof, and said bottom pole piece is disposed in the recess, and
the outer circumference of said bottom pole piece faces the inner circumference of said recess with a predetermined gap interposed therebetween.

2. The servo accelerometer according to claim 1, wherein said closing parts have a smaller magnetic path cross section than said tubular parts.

3. The servo accelerometer according to claim 1, wherein said pair of housings is made of Invar, and said bottom pole pieces are made of an electromagnetic soft iron.

* * * * *